United States Patent
Close et al.

(10) Patent No.: US 9,183,527 B1
(45) Date of Patent: Nov. 10, 2015

(54) ANALYZING INFRASTRUCTURE DATA

(71) Applicant: RedZone Robotics, Inc., Pittsburgh, PA (US)

(72) Inventors: Eric C. Close, Sewickley, PA (US); Kevin Lipkin, Pittsburgh, PA (US); Subramanian Vallapuzha, Pittsburgh, PA (US); Sam Cancilla, Cranberry Township, PA (US); Tyler Foreman, Petaluma, CA (US); Foster J. Salotti, Pittsburgh, PA (US); Matt Horton, Sewickley, PA (US)

(73) Assignee: RedZone Robotics, Inc., Pittsburgh, PA (US)

( * ) Notice: Subject to any disclaimer, the term of this patent is extended or adjusted under 35 U.S.C. 154(b) by 113 days.

(21) Appl. No.: 13/654,380

(22) Filed: Oct. 17, 2012

Related U.S. Application Data

(60) Provisional application No. 61/547,902, filed on Oct. 17, 2011.

(51) Int. Cl.
*G06Q 10/06* (2012.01)
*G06Q 50/06* (2012.01)
*G06F 17/30* (2006.01)

(52) U.S. Cl.
CPC .......... *G06Q 10/0635* (2013.01); *G06Q 50/06* (2013.01); *G06F 17/30557* (2013.01)

(58) Field of Classification Search
CPC .............. G06Q 10/0635; G06Q 50/06; G06F 17/30557
USPC ................... 707/743, 776, 999.101, 999.102
See application file for complete search history.

(56) References Cited

U.S. PATENT DOCUMENTS

| | | | | |
|---|---|---|---|---|
| 6,708,183 | B1 * | 3/2004 | Mori et al. ........................... 1/1 |
| 6,967,478 | B2 * | 11/2005 | Wayman et al. .............. 324/238 |
| 6,970,808 | B2 * | 11/2005 | Abhulimen et al. .......... 702/185 |
| 7,263,465 | B2 * | 8/2007 | Turley et al. .................. 702/182 |
| 7,869,944 | B2 * | 1/2011 | Deaton et al. ................. 701/491 |
| 7,908,660 | B2 * | 3/2011 | Bahl ............................... 726/25 |
| 8,041,517 | B2 * | 10/2011 | Thayer et al. ................... 702/33 |
| 8,200,737 | B2 * | 6/2012 | Tarabzouni et al. .......... 709/200 |
| 8,510,147 | B2 * | 8/2013 | Mitra et al. .................. 705/7.17 |
| 8,639,483 | B1 * | 1/2014 | Walski et al. ..................... 703/9 |
| 2003/0011363 | A1 * | 1/2003 | Wayman et al. .............. 324/238 |
| 2003/0033117 | A1 * | 2/2003 | Sage ............................. 702/182 |
| 2004/0122600 | A1 * | 6/2004 | Dupuis et al. ................... 702/34 |
| 2005/0246112 | A1 * | 11/2005 | Abhulimen et al. ............ 702/51 |
| 2006/0129338 | A1 * | 6/2006 | Turley et al. .................... 702/51 |

(Continued)

OTHER PUBLICATIONS

Paez et al., "Developing a Pipeline Risk Assessment Tool for the Upstream Oil and Gas Industry", Northern Area Western Conference, Feb. 15-18, 2010, pp. 1-18.*

(Continued)

*Primary Examiner* — Phuong Thao Cao
(74) *Attorney, Agent, or Firm* — Ference & Associates LLC

(57) ABSTRACT

One aspect provides a method of generating an infrastructure analysis report, including: accessing infrastructure data stored in a database relating to one or more fluid conveyance infrastructure assets, wherein the infrastructure data is one or more of sensed data, contextual data and institutional knowledge data; and generating an analysis report based on a failure risk and consequence analysis of the one or more fluid conveyance infrastructure assets. Other aspects are described and claimed.

15 Claims, 13 Drawing Sheets

(56) References Cited

U.S. PATENT DOCUMENTS

| | | | |
|---|---|---|---|
| 2006/0235611 A1* | 10/2006 | Deaton et al. | 701/207 |
| 2006/0259336 A1* | 11/2006 | Anas et al. | 705/7 |
| 2006/0288756 A1* | 12/2006 | De Meurechy | 73/1.01 |
| 2007/0050157 A1* | 3/2007 | Kahn et al. | 702/55 |
| 2007/0174023 A1* | 7/2007 | Bassin et al. | 702/186 |
| 2007/0195712 A1* | 8/2007 | Thayer et al. | 370/254 |
| 2007/0219728 A1* | 9/2007 | Papageorgiou et al. | 702/23 |
| 2007/0222436 A1* | 9/2007 | Gao et al. | 324/220 |
| 2008/0109175 A1* | 5/2008 | Michalak | 702/50 |
| 2008/0133550 A1* | 6/2008 | Orangi et al. | 707/100 |
| 2008/0189788 A1* | 8/2008 | Bahl | 726/25 |
| 2008/0312990 A1* | 12/2008 | Byrne | 705/7 |
| 2009/0112525 A1* | 4/2009 | Adani | 702/189 |
| 2009/0138306 A1* | 5/2009 | Coburn et al. | 705/7 |
| 2010/0036702 A1* | 2/2010 | Sitton | 705/8 |
| 2010/0250312 A1* | 9/2010 | Tarabzouni et al. | 705/7 |
| 2011/0137704 A1* | 6/2011 | Mitra et al. | 705/7.28 |
| 2011/0259115 A1* | 10/2011 | Roberts et al. | 73/800 |
| 2012/0059684 A1* | 3/2012 | Hampapur et al. | 705/7.28 |
| 2012/0134527 A1* | 5/2012 | Culp et al. | 382/100 |
| 2012/0203591 A1* | 8/2012 | Andoji et al. | 705/7.28 |
| 2012/0279599 A1* | 11/2012 | Gluskin et al. | 138/97 |
| 2012/0317058 A1* | 12/2012 | Abhulimen | 706/2 |
| 2013/0041705 A1* | 2/2013 | Hampapur et al. | 705/7.12 |
| 2013/0179213 A1* | 7/2013 | Coleman et al. | 705/7.25 |
| 2013/0211797 A1* | 8/2013 | Scolnicov et al. | 703/2 |
| 2013/0321131 A1* | 12/2013 | Tucker et al. | 340/10.1 |
| 2013/0339081 A1* | 12/2013 | Maeno | 705/7.28 |
| 2013/0340836 A1* | 12/2013 | Wambold | 137/10 |

OTHER PUBLICATIONS

DNV and W. Kent Muhlbauer, "Pipeline Risk Assessment", in Pipeline & Gas Journal, May 2012, pp. 1-7.*

Nwosu et al., "Risk Analysis Methods for Pipelines in Niger Delta", in Journal of Innovative Research in Engineering and Science 2(2), Apr. 2011, pp. 94-106.*

Mashford et al., "An Approach to Leak Detection in Pipe Networks using Analysis of Monitored Pressure Values by Support Vector Machine", In 2009 Third International Conference on Network and System Security, 2009, pp. 534-539.*

* cited by examiner

ANALYZING INFRASTRUCTURE DATA

CROSS REFERENCE TO RELATED APPLICATIONS

This application claims priority to U.S. Provisional Patent Application Ser. No. 61/547,902, entitled "SYSTEM AND METHOD FOR ANALYZING INFRASTRUCTURE DATA", filed on Oct. 17, 2011, the contents of which are incorporated by reference in their entirety herein.

FIELD

The subject matter described herein generally relates to analyzing infrastructure data from a variety of sources. Specifically, the subject matter described herein relates to analyzing pipe segment data and related infrastructure data.

BACKGROUND

A large amount of infrastructure data (e.g., relating to a network of pipes) exists. For example, this infrastructure data may include information regarding various conditions of the pipes, locations of the pipes within a network, methods of repairing, cleaning, or replacing the pipes, costs associated therewith, maintenance schedules, and the like.

There are many contexts in which a condition of a pipe is of importance. For example, every year, wastewater managers must make decisions about which portions of their collection system should be maintained, rehabilitated or replaced. The Environmental Protection Agency (EPA) and American Society of Civil Engineers (ASCE) both project hundreds of billions of dollars of investment shortfalls facing aging wastewater infrastructure. Thus, it is important that wastewater managers are able to spend their limited funds most wisely to reduce risks and maintain service levels at a low cost.

In the example context of managing a municipal wastewater collection system, a wastewater manager faced with a limited budget makes prioritization and investment decisions based on the best information available at the time. Unfortunately, although a large amount of information may be available, this information is often difficult to access and analyze and thus is often unusable. This is due to lack of adequate technology for providing accurate representations of the condition of the pipe sections making up the collection system and the absence of systems and methods for organizing and analyzing the infrastructure data.

BRIEF SUMMARY

In summary, one aspect provides a method of generating an infrastructure analysis report, comprising: accessing infrastructure data stored in a database relating to one or more fluid conveyance infrastructure assets, wherein the infrastructure data is one or more of sensed data, contextual data and institutional knowledge data; and generating an analysis report based on a failure risk and consequence analysis of the one or more fluid conveyance infrastructure assets.

Another aspect provides a method of generating an analysis report, comprising: accessing infrastructure data stored in a database relating to one or more fluid conveyance infrastructure assets, wherein the infrastructure data is cross referenced data from different infrastructure networks; and generating an analysis report based on a failure risk and consequence analysis of the one or more fluid conveyance infrastructure assets.

A further aspect provides a method of generating an analysis report, comprising: accessing infrastructure data stored in a database relating to one or more fluid conveyance infrastructure assets, wherein the infrastructure data includes contextual data; and determining a correlation between the contextual data of at least one infrastructure asset and a target infrastructure asset for which no infrastructure data is stored in the database; and generating an analysis report based the correlation, the analysis report including a failure risk and consequence analysis of the target infrastructure asset.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
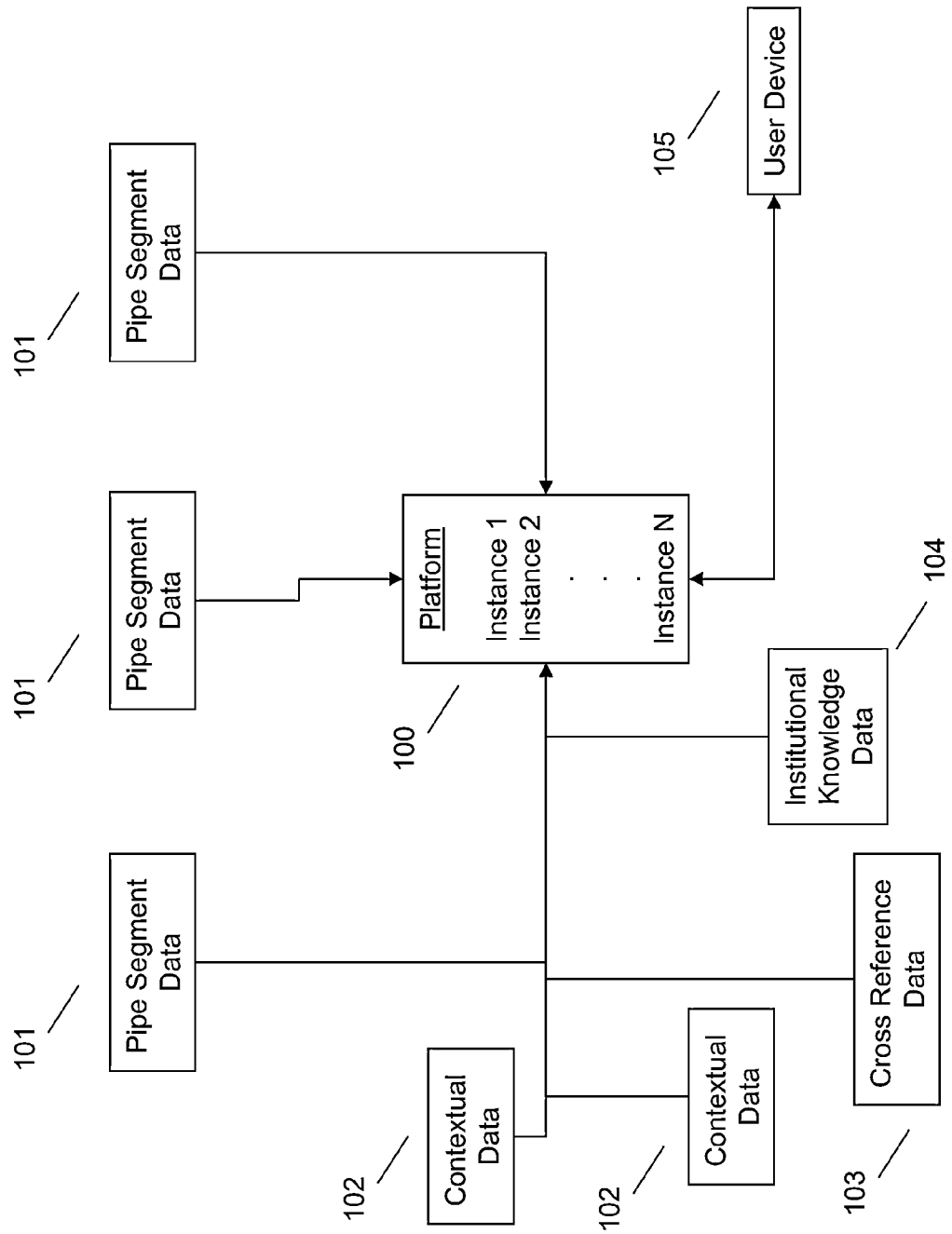
FIG. 1 illustrates an example platform system for analyzing infrastructure data.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Especially in critical large-diameter trunks and interceptors, visual-only inspection of pipes, such as using CCTV, is often unreliable and leaves decision-makers with the tough task of evaluating which pipes might be deteriorating. With costly rehab decisions at stake, wastewater managers need objective facts on the condition of their pipes, not just visual evidence of potential problems.

Underground infrastructure, as further described herein, involves the need to access and collect data in a variety of structures. In this regard, as used herein the terms "fluid conveyance infrastructure" or simply "infrastructure", have the meaning of water and/or sewer physical infrastructure, including pipes, manholes, laterals, access shafts, junction chambers, valve chambers, and treatment structures.

Co-pending and commonly assigned U.S. patent application Ser. No. 13/654,376, entitled "GRAPHICALLY REPRESENTING A CONDITION OF INFRASTRUCTURE", filed Oct. 17, 2012, incorporated by reference herein, describes systems and methods for collection of infrastructure data, processing the infrastructure data and related data, and graphically representing a condition of the infrastructure. Infrastructure data, for example pipe condition data, may be collected for example using a pipe inspection robot utilizing an architecture similar to that disclosed in U.S. patent application Ser. No. 12/611,641, the contents of which are incorporated by reference herein, for example by a data acquisition platform such as the HD PROFILER SYSTEM, available from REDZONE ROBOTICS of Pittsburgh, Pa. With the presence of precise data describing the condition of infrastructure, such as a pipe segment, many opportunities exist for leveraging such pipe related data in analyzing an infrastructure, such as a wastewater management system.

Embodiments provide systems and methods that allow users to analyze infrastructure based on objective, reliable measurements of the condition of pipe(s) that are presented in useful, intuitive and easily understood formats. In terms of data collection, embodiments may utilize pipe segment data collected using multi-sensor collection techniques, for example as described in co-pending and commonly assigned U.S. patent application Ser. No. 13/654,376, entitled "GRAPHICALLY REPRESENTING A CONDITION OF INFRASTRUCTURE", filed Oct. 17, 2012. Embodiments may also utilize other data sources, such as contextual data, either separately or in some combination with such pipe segment data, for example pipe segment location data, service call history data for a pipe segment or type, geographic data (e.g. proximity of pipe segments to water bodies), data indicating inclination of a pipe segment, and the like, as further described herein.

Accordingly, embodiments provide systems and methods for analyzing infrastructure data that may be leveraged in making decisions, for example decisions regarding performing maintenance and rehabilitation work on infrastructure assets. Infrastructure assessment results in a large volume and variety of data sets. Embodiments enable a user to understand and make fact-based decisions that are driven by this abundant and rich data. Thus, embodiments provide an option to optimally deploy limited resources in operating, monitoring, managing, maintaining and rehabilitating the infrastructure.

According to various embodiments, a system (which may include a computing system that executes software) allows for the consolidation of infrastructure data collected into a centralized system or data base that may index data both spatially and temporally, for example as described in U.S. Pat. No. 8,041,517, incorporated by reference herein. Detailed analysis and work planning may then be performed using the organized data.

As described further herein, an embodiment may also collect contextual data beyond sensed data (i.e., data sensed with a pipe inspection robot, for example as described in co-pending and commonly assigned U.S. patent application Ser. No. 13/654,376, entitled "GRAPHICALLY REPRESENTING A CONDITION OF INFRASTRUCTURE", filed Oct. 17, 2012). For example, users familiar with the operation and maintenance of particular infrastructure assets, such as a wastewater manager in a particular municipality, typically have institutional knowledge regarding the nature, behavior, quirks and operation of these infrastructure assets. This knowledge is at risk of loss, for example if the particular user retires or leaves for another position. Accordingly, an embodiment provides for capturing and storing such knowledge, for example in the form of written comments, audio clips, video clips, presentations and the like. This data may likewise be organized and indexed (e.g., temporally and spatially) in an infrastructure data store for future use.

Moreover, an embodiment provides mechanisms making the infrastructure data accessible across different infrastructure networks, cities, municipalities, and the like. This allows users to make use of knowledge gained by others and facilitates employment of best practices for operation, maintenance, rehabilitation and the like for infrastructure assets. The data that is cross referenced across different infrastructure networks could be shared in aggregate, with anonymity, or in full detail based on the level of sharing authorized by the infrastructure network owner. This data that is cross referenced across different infrastructure networks could include failure modes and failure rates as impacted by size, material, location, age, flow rate, flow level, service call history, maintenance history, etc. This data that is cross referenced across different infrastructure networks could also include failure mitigation success rates and costs associated with different maintenance and rehabilitation methodologies employed.

A challenge of proper infrastructure asset data management is that if the data is not properly organized, for example spatially and temporally indexed at acquisition time, it may need to be organized at a later time. Accordingly, an embodiment provides a multi-track editor that enables manual and/or automated correction of different data sets to organize them, for example in spatial and temporal indices.

Typically, cities and municipalities have large infrastructure asset bases, for example extensive wastewater pipe networks, but do not have the ability to assess the entire system within one budgetary period, often due to budgetary constraints. In such cases, an embodiment affords the ability to use contextual information such as location, service call history, proximity to water bodies, relation to other portions of the network or similar networks, etc., and recommend a statistically representative sample set of assets to inspect to get a general representative understanding of the condition of the entire network or a portion thereof. Based on the results of such a sampling inspection, a statistical estimate of pipe condition may be generated, for example for the entire pipe network or a portion thereof, and as a result an estimation of costs (operations, maintenance, etc.) for the entire network or a portion thereof may be generated.

Based on the sensed data, contextual data and cross referenced data (collectively infrastructure data), an embodiment can select and recommend to a user an optimal capital improvement or operational plan for the entire network that minimizes risk (e.g., of pipe failure) for a given operations and maintenance and capital improvements budget. Such a plan is generated by a multi-dimensional optimization and/or heuristic software based on the infrastructure data given the goal (e.g., risk of pipe failure) within budgetary and/or other constraints. The results from these optimal plans can be reviewed in a condensed and/or summary format with an ability to override the recommendation(s) or choose alternatives, perform what-if type analyses and the like prior to approving the plan. What-if analyses can cover different rehabilitation methodologies, different rehabilitation extents (e.g., point or segment or system repair), different maintenance methodologies and extents, etc.

An embodiment may offer benchmarks, for example benchmarking infrastructure asset condition across different cities, municipalities, etc., to allow comparison to average benchmarks as well as to rate in percentile different aspects of a city's infrastructure condition, plan, costs, etc., against a cross reference data set including relevant comparative data set(s).

The description now turns to the figures. The illustrated example embodiments will be best understood by reference to the figures. The following description is intended only by way of example and simply illustrates certain selected example embodiments representative of the invention, as claimed. It should be noted that although wastewater pipes are specifically mentioned as examples herein, the various embodiments may be employed in connection with other pipe segment types and other comparable infrastructure assets generally.

Referring to FIG. 1, an embodiment provides a platform 100 that receives infrastructure data from a variety of sources. For example, the platform 100 receives pipe segment data 101, i.e., data collected with pipe inspection robot(s) at a given time and synchronized with a particular location within a pipe segment (either at the time of collection or in a post processing procedure, as further described herein). The platform 100 may also receive contextual data 102 from a variety of sources, such as remotely connected devices storing relevant infrastructure information, for example pipe segment location data, service call history data for a pipe segment or type, geographic data indicating proximity of pipe segments to water bodies, data regarding the depth of a pipe segment, etc. The platform may also receive cross reference data 103, for example reference infrastructure information from other cities, municipalities, etc., as well as best practices data, contractor related data, cost data, and the like. The platform may also receive institutional knowledge data 104, for example text or video notes of an employee familiar with a particular infrastructure asset or feature.

Although an infrastructure manager may often have access to some or all of this data, the data is rendered unusable if it is not properly managed. Accordingly, an embodiment provides a platform 100 that facilitates data consolidation, normalization, and organization, for example indexing the data both spatially (in terms of pipe segment location throughout a pipe network and/or related characteristics (e.g., pipe inclination, proximity to water, pipe segment material type, etc.)) and temporally (time of collection). As a result, decision makers have a high level of confidence in the accessibility and usability of the infrastructure data they need to make effective decisions.

In an example embodiment, the infrastructure data is referenced to a common spatial and temporal reference, allowing the ability to cross reference different infrastructure data at a common point in time and/or space. The infrastructure data is also consolidated onto a centrally managed data store driven platform 100 so that decision makers can view a complete picture of all infrastructure data known about a particular infrastructure asset or system of assets. This allows detailed analyses and planning to take place efficiently and with high levels of confidence.

Figure 2:
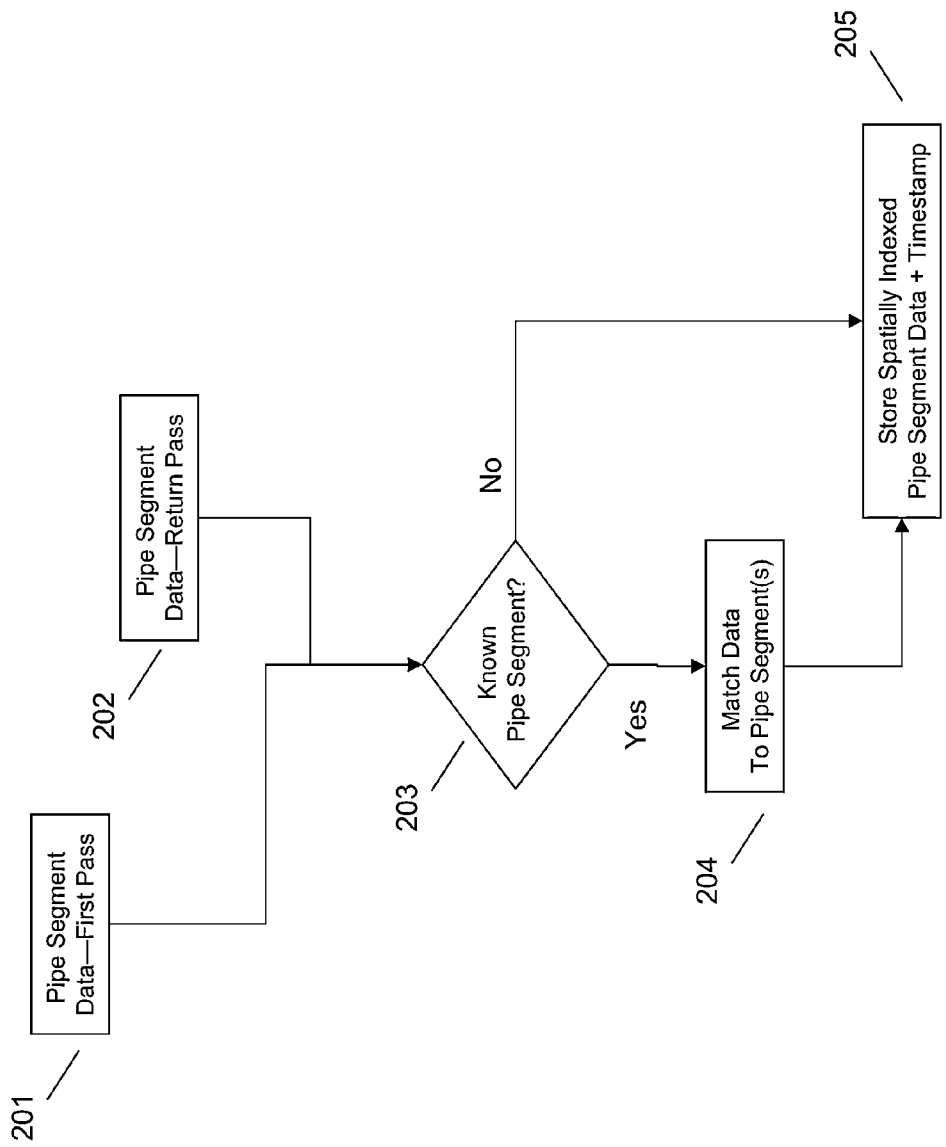
FIG. 2 illustrates an example method for synchronizing infrastructure data.

Referring to FIG. 2, pipe inspection robots perform assessments/inspections of infrastructure assets that often consist of multiple data sets collected in the field. For example, a single data inspection robot may traverse a pipe segment in the forward direction, collecting a first pass of pipe segment data 201 (pipe segment data is also referred to herein as a "track" of data or a data set), and in the reverse direction, collecting a second pass of pipe segment data 202. These sets of pipe segment data 201, 202 may even be captured by different sensors, and often are collected asynchronously.

In order to make this pipe segment data more useful to infrastructure managers, an embodiment synchronizes the pipe segment data 201, 202 both spatially and temporally based on a similarity parameter (for example, geographic location, pipe inspection robot that collected the pipe segment data set, etc.) so that an accurate view of the condition and state of the pipe segment may be developed for any point within the asset network. Thus, an embodiment may determine if one or both of the first pass pipe segment data 201 or the return pass pipe segment data 202 is from a know pipe segment at 203. This determination may be done by matching a characteristic of the pipe segment data sets 201, 202 to pipe segment assets in the network. The matching may be done in a variety of ways, for example based on metadata associated with the pipe segment data sets 201, 202, including identification of the pipe inspection robot that collected the data set(s), metadata indicating geographic location of pipe segment data collection (e.g., as ascertained via GPS data, landmark data, or the like) or the like.

If it is determined that the pipe segment data cannot be matched with a known pipe segment at 203, the pipe segment data set in question may be stored as a new instance, i.e., a first instance of pipe segment data for a given asset in the network, or it may be stored as an exception for later manual resolution, or a suitable combination of the foregoing. If it is determined that the pipe segment data is matched to a known pipe segment in the network at 203, then an embodiment matches the pipe segment data to the known segment within the infrastructure network 204 and stores the pipe segment data (including timing information) in an index at 205. Thus, the pipe segment data sets 201, 202 may be organized into a spatial and temporal index for later recall and analysis, as further described herein.

Figure 3:
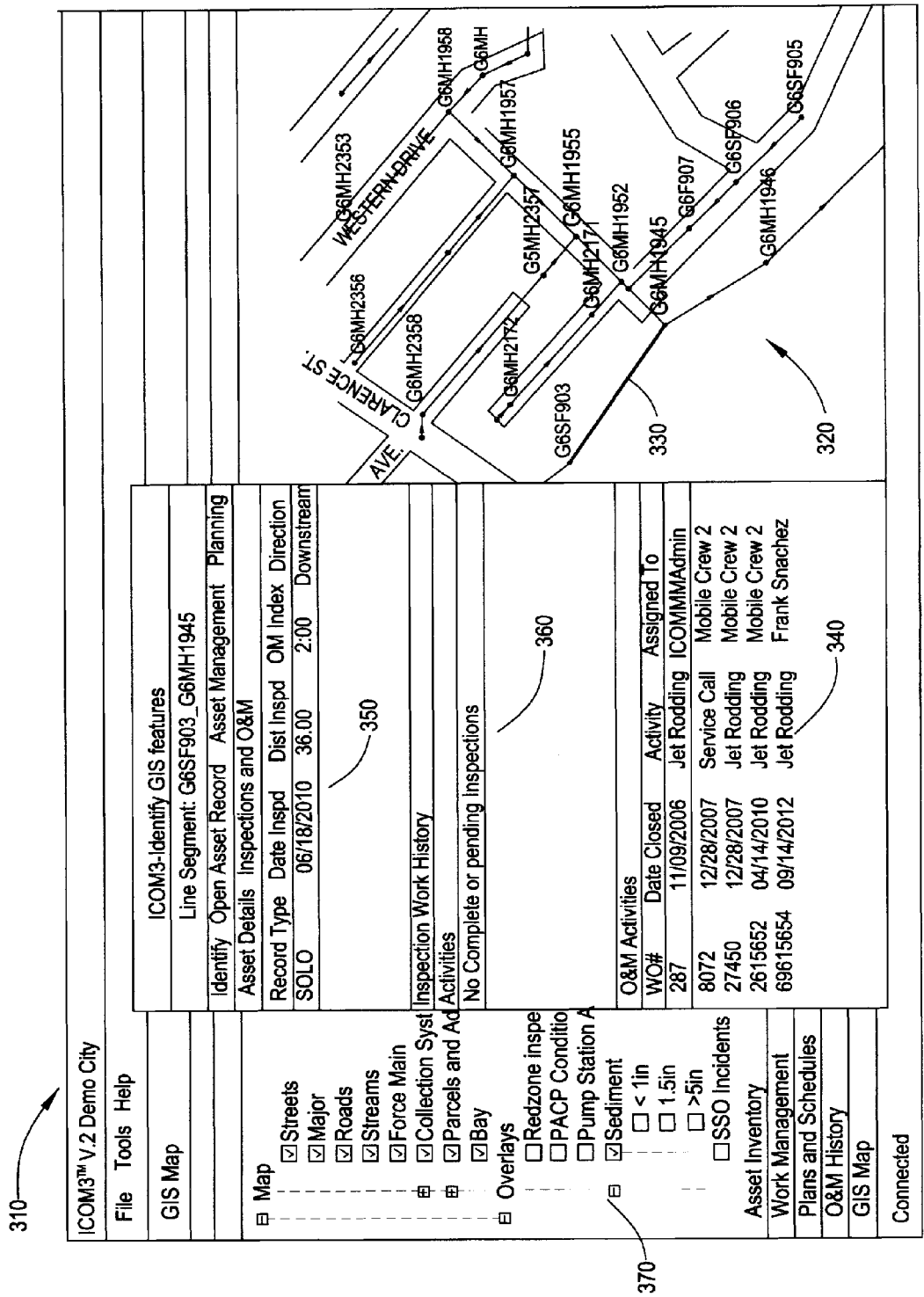
FIG. 3 illustrates an example user interface for displaying organized infrastructure data.

Illustrated in FIG. 3, a consolidated view 310 of the synchronized infrastructure data provided for a particular pipe segment 330 in a network of pipes. The synchronized infrastructure data is referenced to a common spatial (i.e., location in a network) and temporal reference, allowing the ability to cross reference different pipe segment data sets at a common point in time or space. As illustrated, the view includes a geographic map 320 illustrating a portion of the network for a relevant pipe segment 330, which is highlighted in the view 310.

The view 310 additionally provides a listing of time ordered maintenance procedures 340 performed on the pipe segment highlighted 330. Such data may be included in the platform 100 data store, for example as stored contextual data 102 entered by a municipal worker. Moreover, the view 310 provides pipe segment data 350 for the particular pipe segment 330 (one pipe inspection data set is illustrated in this example), including various information such as the type of pipe inspection robot that collected the pipe inspection data 350, the time and direction of pipe segment data collection, etc.

The view 310 additionally provides an activities panel 360 that provides information about pending activities, for example scheduled or needed maintenance (here none are listed). A features panel 370 offers, in this non-limiting example, a faceted selection of features that may be included/excluded from the view, such as map details, overlays, and the like. Thus, a user may select the amount and type of feature details included in the view 310 which the platform 100 will retrieve and display in the view 310. In this example, the overlay of "sediment" is selected in the features panel 370, and the highlighted pipe segment 330 is color coded to match its level of sedimentation (indicated by a key in the features filter panel), as ascertained in pipe segment data 350.

Thus, an embodiment provides a view 310 of the consolidated infrastructure data relevant to the asset that is organized, retrieved and provided by the platform 100 so that decision makers can quickly gain access to and view a complete picture of all infrastructure data known about the particular infrastructure asset or system of assets. This allows detailed analysis and planning to take place efficiently and with high levels of confidence.

Figure 4:
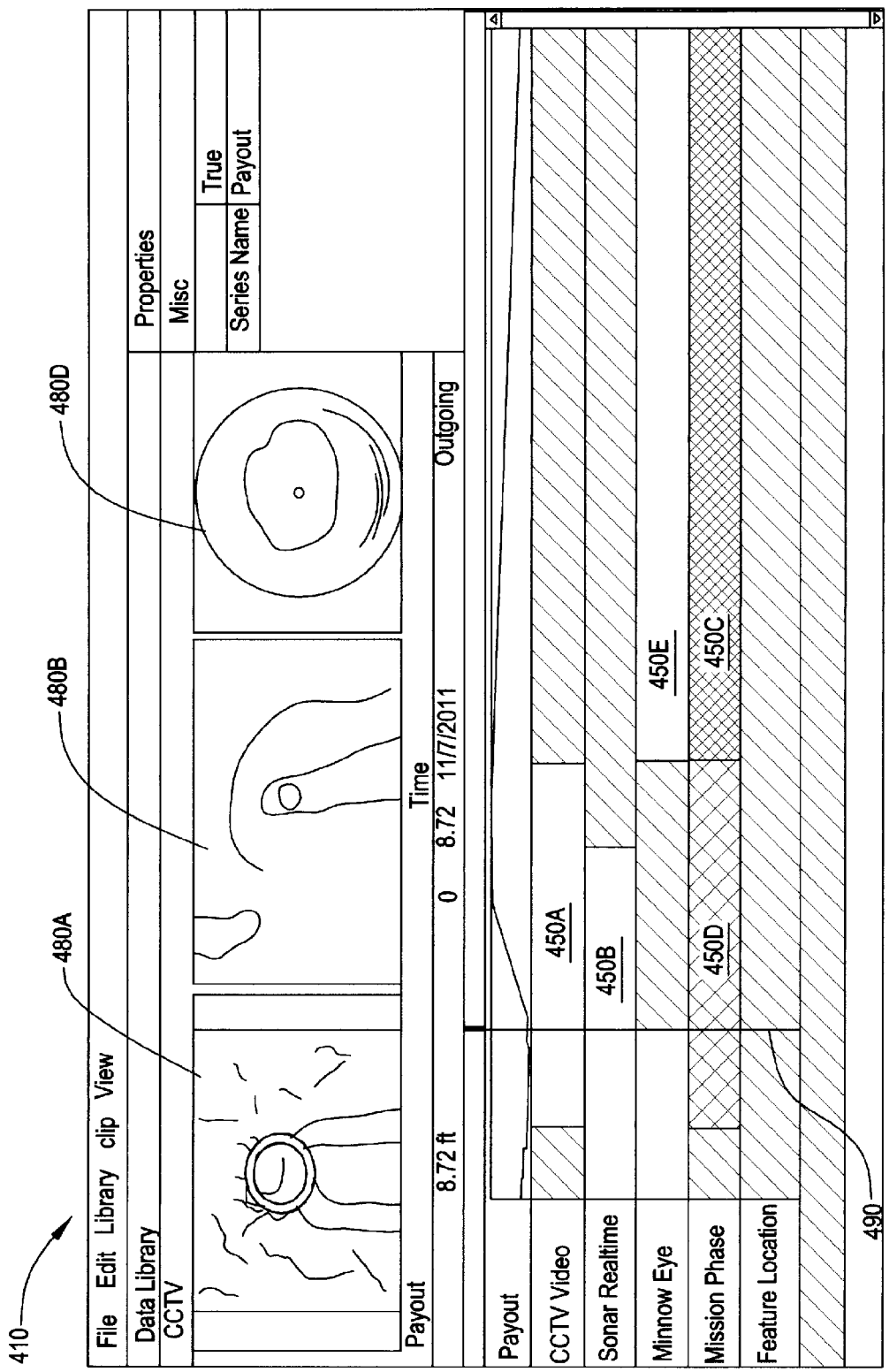
FIG. 4 illustrates an example data track editor interface.

Referring to FIG. 4, an embodiment provides a multi-track editor 410 that enables the infrastructure data synchronization to take place by combining both auto-alignment of the infrastructure data, for example, pipe segment data tracks 450A-450E, based on observed landmarks during the assessment, using time stamps recorded with the data tracks, user manual adjustment within the multi-track editor itself, or using some other parameter for synchronizing the pipe segment data tracks 450A-450E (or infrastructure data of interest). For example, a user may re-align the pipe segment data tracks 450A-450E via sliding the pipe segment data tracks 450A-450E in the multi-track editor 410. The indicator 490 indicates the location within the pipe segment data tracks 450A, 450B, and 450D. The panels 480A, 480B, and 480D display the actual pipe segment data from the portion of the pipe segment data that is aligned with the indicator 490. The output of the track editor may thus be a synchronized, navigable view of all data streams in common spatial and temporal indices. Accordingly, the multi-track editor 410 provides a convenient way to view and/or re-align multiple tracks of pipe segment data and provides a means to convert raw data sets that may not be temporally or spatially aligned into an aligned data set that can be used to evaluate condition of the asset with high levels of confidence.

An example of such an alignment is when a data acquisition platform collects in one pass laser and/or sonar data, and in another pass (e.g., another day), gas level data for the same pipe segment. This data is not temporally synchronized. However, a user may synchronize the data using various characteristics of each (e.g., physical location of collection), to match the data (e.g., via alignment of tracks in an editor view 410) such that the data is synchronized or matched within the system even if the time stamps indicate otherwise.

Figure 5:
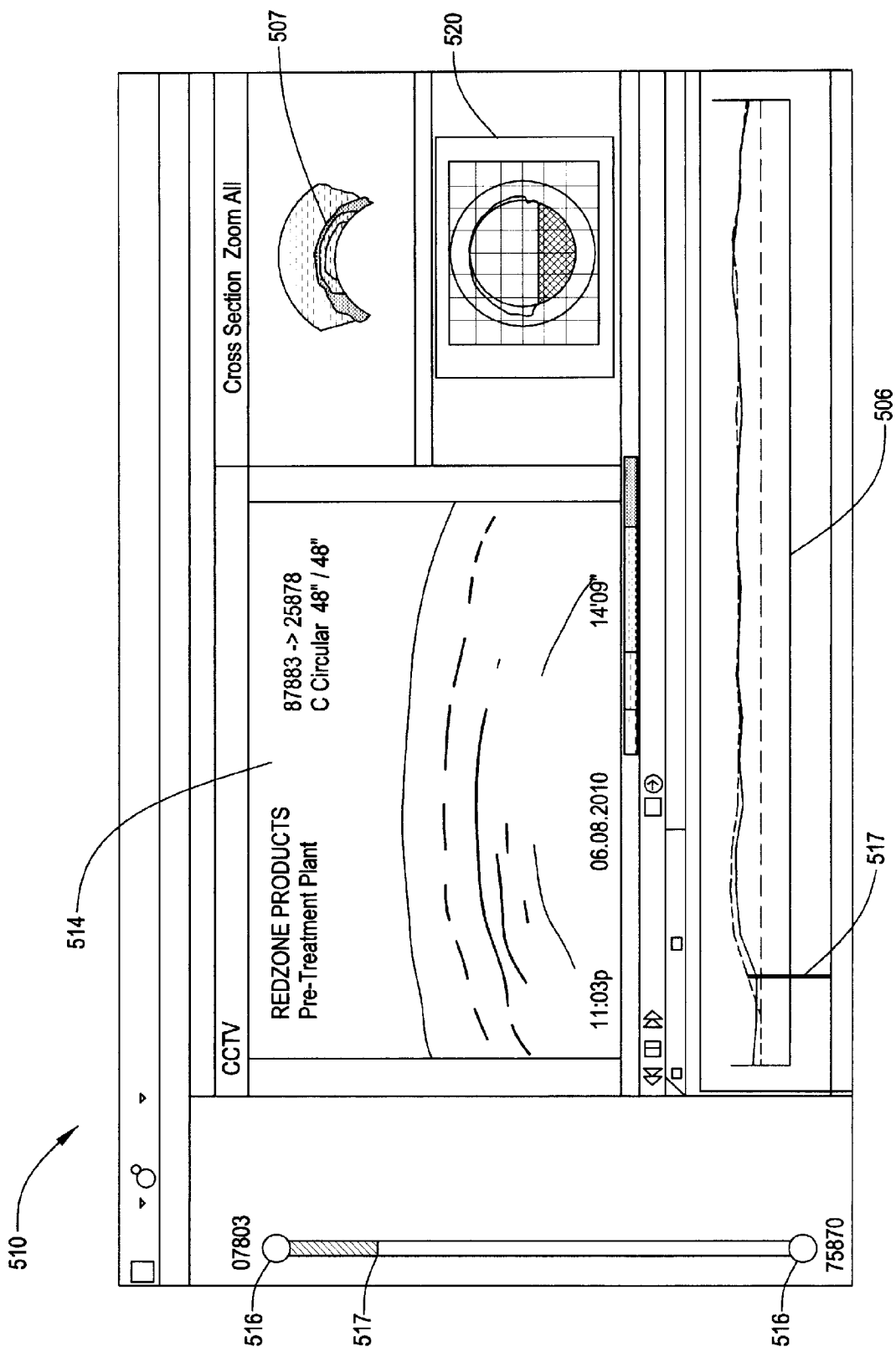
FIG. 5 illustrates an example view of a user interface having various graphical representations of a pipe segment.

An embodiment may combine the various data gathered by pipe inspection robots in various navigable user displays. For example, if a user selects pipe segment data 350 of FIG. 3, the view 510 illustrated in FIG. 5 may be displayed. FIG. 5 provides an example view 510 wherein a CCTV image 514 for a particular segment of pipe is provided. The segment of pipe for which data is loaded in this particular view 510 is provided in a left panel, i.e., between two manholes 516. The exact portion of the pipe segment data being viewed currently is illustrated by an indicator 517, which provides easy reference to the user for understanding exactly which pipe segment portion the CCTV image was obtained from due to synchronizing the pipe inspection robot's data collection activities with a physical location with the pipe segment. The indicator 517 may be synchronized in several panels, for example in the lower panel (illustrating vertical and horizontal pipe diameters in X-Y graph form in this example). The user may navigate within the pipe segment data track by moving the indicator, with the various panels of the view 510 updated accordingly.

Moreover, the cross sectional graphic 520 and 3D graphic 507 of the pipe (created using for example pipe segment variation data, as further described in co-pending and commonly assigned U.S. patent application Ser. No. 13/654,376, entitled "GRAPHICALLY REPRESENTING A CONDITION OF INFRASTRUCTURE", filed Oct. 17, 2012) at the indicator 917 are likewise synchronized with the portion of the pipe segment indicated by the indicator 917. Accordingly, an embodiment provides detailed views of pipe segment data synchronized in space and time in a pipe network. This permits an asset manager to view and analyze specific details for a particular portion of the network prior to approving a particular plan.

While detailed information regarding individual pipe segments is valuable, asset managers do not typically have the resources to inspect or assess their entire network of assets in a timely manner, and often do not have an up to date representation of the condition of the network as a whole. This often forces them to focus in on small subsets of their network, one at a time, leaving the other areas exposed to potential failure.

Accordingly, an embodiment allows users make use of contextual data 102, cross reference data 103, institutional knowledge data 104, and the like, available within the consolidated platform 100, in some cases in addition to detailed pipe condition data, to make informed decisions regarding larger portions of the network or the entire network of pipes. An embodiment performs statistical analyses to help users manage network assets.

Figure 6:
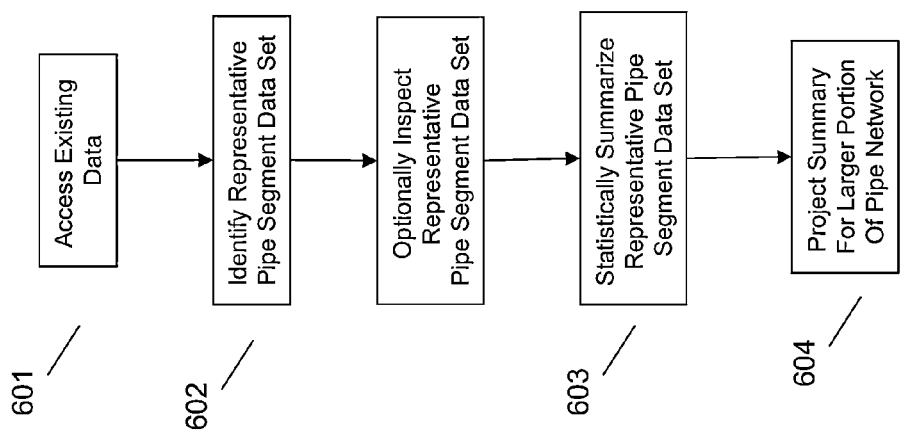
FIG. 6 illustrates an example method for summarizing pipe network data.

Referring to FIG. 6, for example, an embodiment may perform a statistical analysis to identify a sample set of assets that can be inspected (or statistically analyzed if already inspected) to provide an estimate of the overall condition of the neighboring (uninspected) assets within the area or even project the condition of an entire network of assets. Thus, to provide such a statistical analysis, the platform 100 may access data stored 601 (e.g., pipe segment data 101, contextual data 102, institutional knowledge data 104, and/or cross reference data 103) to determine a sample set 602 for a give portion of the pipe network that is partially inspected or even completely uninspected.

The platform may access existing pipe segment data at 601 from the portion of the pipe network inspected to identify a representative pipe segment data set at 602. Although the existing pipe segment data may be incomplete, it may be summarized statistically to provide an indication of the condition of the remaining pipe segments in the portion of the pipe network in question. If there is a need to collect pipe inspection data, the platform may provide a representative set of assets for inspection, which the user may conduct to create a representative data set.

Moreover, the platform 100 has access to other data, such as contextual data 102, that may assist in choosing a sample set (either for analysis or future inspection). For example, similar pipe segments (and pipe segment data thereof) may be selected based on location within the network (geographic similarity), similarity in age, or the like. Moreover, platform 100 may use cross reference data 103 to ascertain pipe segment data from a different pipe network that is comparable. The platform also may use institutional knowledge data 104 (e.g., an explicit linking in pipe characteristics for different parts of the pipe network) to ascertain a sample set.

Irrespective of how a sample set of existing pipe segment data is chosen at 602, an embodiment may perform a statistical analysis on existing pipe segment data (or collected pipe segment data) and summarize the pipe segment data set at 603. The statistical summary may be based on the pipe segment data of the sample set. A variety of parameters may be used for the statistical analysis, for example as selected by a user based on a characteristic of interest, such as sediment condition, corrosion condition, ovality, remaining useful life, and the like.

Once the sample set of pipe segment data is statistically summarized at 603, the summary may be projected to the larger portion of the pipe network of interest at 604. Accordingly, an embodiment provides a statistical estimate for pipe network that has only been partially inspected or that has not yet been inspected. Naturally, the statistical estimate may be provided for an entire pipe network in order to provide asset managers with an overall, comprehensive analysis of the network condition, for example in terms of erosion/corrosion of pipes within the network, sediment buildup therein, remaining useful life, and the like. Moreover, multiple statistical analyses performed for individual portions of a network may be merged into a comprehensive summary of the entire network.

Among other uses, asset managers can use such statistical estimates to prioritize areas for focused inspections, as well as to estimate the costs for operations and maintenance for regions of the network or the network as a whole. Embodiments thus provide users a data driven confidence that they are focusing their resources on the areas that need it most and not inadvertently neglecting critical situations in their network that could lead to failures.

Embodiments may utilize the platform's 100 access to multiple data sources to assist asset managers in identifying areas of the network most in need of maintenance, cleaning, replacement, repair or further inspection. Thus, an embodiment may provide a statistical summary of the pipe network or a portion thereof using the pipe inspection data collected in the field as well as contextual or other data obtained from spatial location or institutional knowledge captured in the system. This statistical analysis may provide scores on relevant parameters (e.g., corrosion, sediment, and the like) which can be queried by a user.

Figure 7:
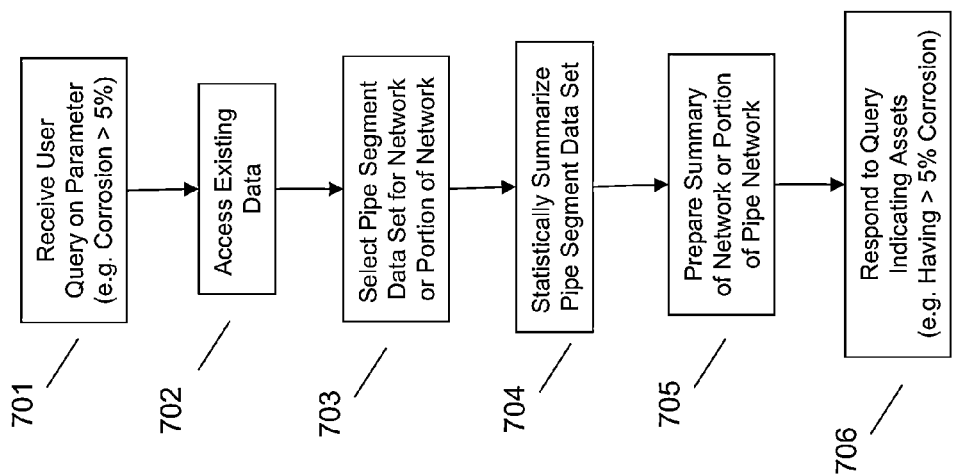
FIG. 7 illustrates an example of querying pipe network data.

For example, in FIG. 7 an example of creating a queriable analysis and querying thereof is illustrated. A user may issue a query to the platform 100 at 701, for example asking for assets having a certain characteristic, e.g., having a corrosion level of over 5% wall loss. Based on the pipe segment data collected for the network, the platform 100 accesses stored pipe segment data at 702. The platform 100 may then select pipe segment data for the network (or portion thereof) of interest to the user (i.e., the network indicated in the query) at 703. The platform 100 then statistically summarizes the pipe segment data 704, for example estimating which pipe segments have experienced a corrosion loss of over 5%. The platform may have this data already stored, for example as a result of analyzing pipe segment data returned form pipe inspection robots, or may perform the statistical analysis from the raw data in response to the query.

When the platform 100 has compiled the statistical analysis at 704, a summary of the network (or portion thereof) may be prepared at 705. For example, the platform may compile a list of pipe segments that have suffered over 5% corrosion, may compile a graphical display of the pipe segments that have suffered over 5% corrosion, or a suitable combination of the foregoing. Once the statistical summary has been compiled at 705, a response to the query indicating the assets that satisfy the query parameter(s) may be returned to the user at 706.

Infrastructure asset managers manage large systems or networks of individual infrastructure assets. In order for them to develop a full picture of the condition and state of these systems, including the condition of individual portions thereof, an embodiment consolidates various data sources into the single platform 100 that allows them to perform comprehensive analysis both at the system level and at the individual asset level and generate actionable plans for remediation.

Figure 8:
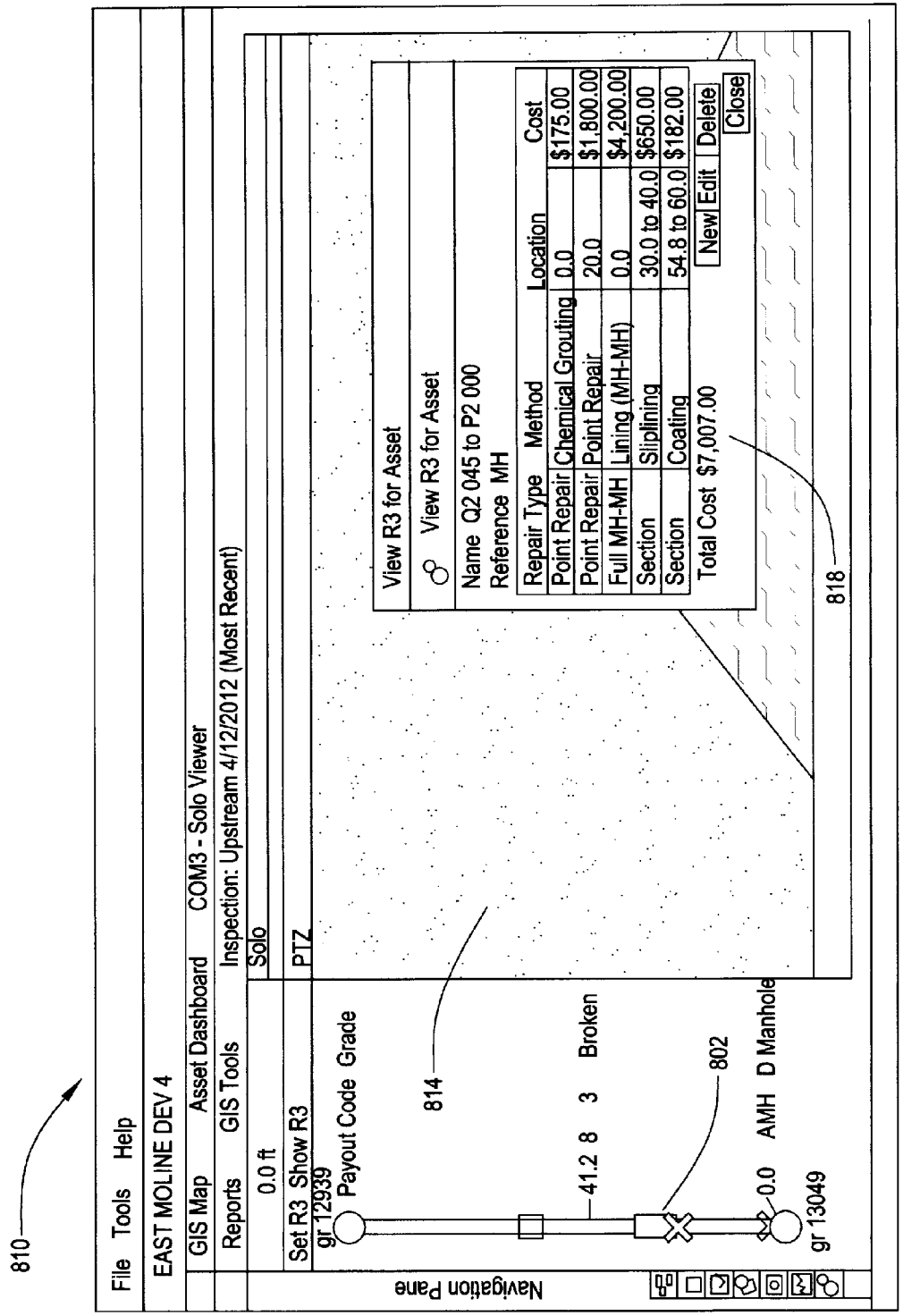
FIG. 8 illustrates an example interface providing an analysis and estimate for pipe segment rehabilitation based on infrastructure data.

As illustrated in FIG. 8, a dashboard 810 may be provided from which a user can view pipe inspection data for a particular segment collected in the field, for example CCTV data 814, as well as other types of relevant data, such as contextual data 802 obtained from spatial location or institutional knowledge stored by the platform 100. Again, from the combination of these data sources, a statistical score for particular characteristics such as pipe wall loss due to corrosion, sediment build up, etc., can be generated for each asset in the network that denotes relative overall condition. These scores can drive the prioritization of operations, maintenance and refurbishment activities and their associated costs for the entire system. The platform 100 may then combine these prioritizations and cost estimates with factors such as available budget to generate an optimized operations and maintenance and capital improvements plan 818 for the particular segment. The platform 100 allows users to run alternate scenarios for optimizing alternate approaches.

Accordingly, embodiments provide systems and methods for organizing abundant and rich pipe network data. The organization and analysis provides asset managers with easy to access summaries of large amounts of data, and allows asset managers to quickly gain an understanding of the network as a whole and individual assets thereof. Moreover, using the analyses, asset managers may prepare the most cost effective strategies for managing their networks using a fact-based approach given the underlying pipe network and related data.

Figure 9:
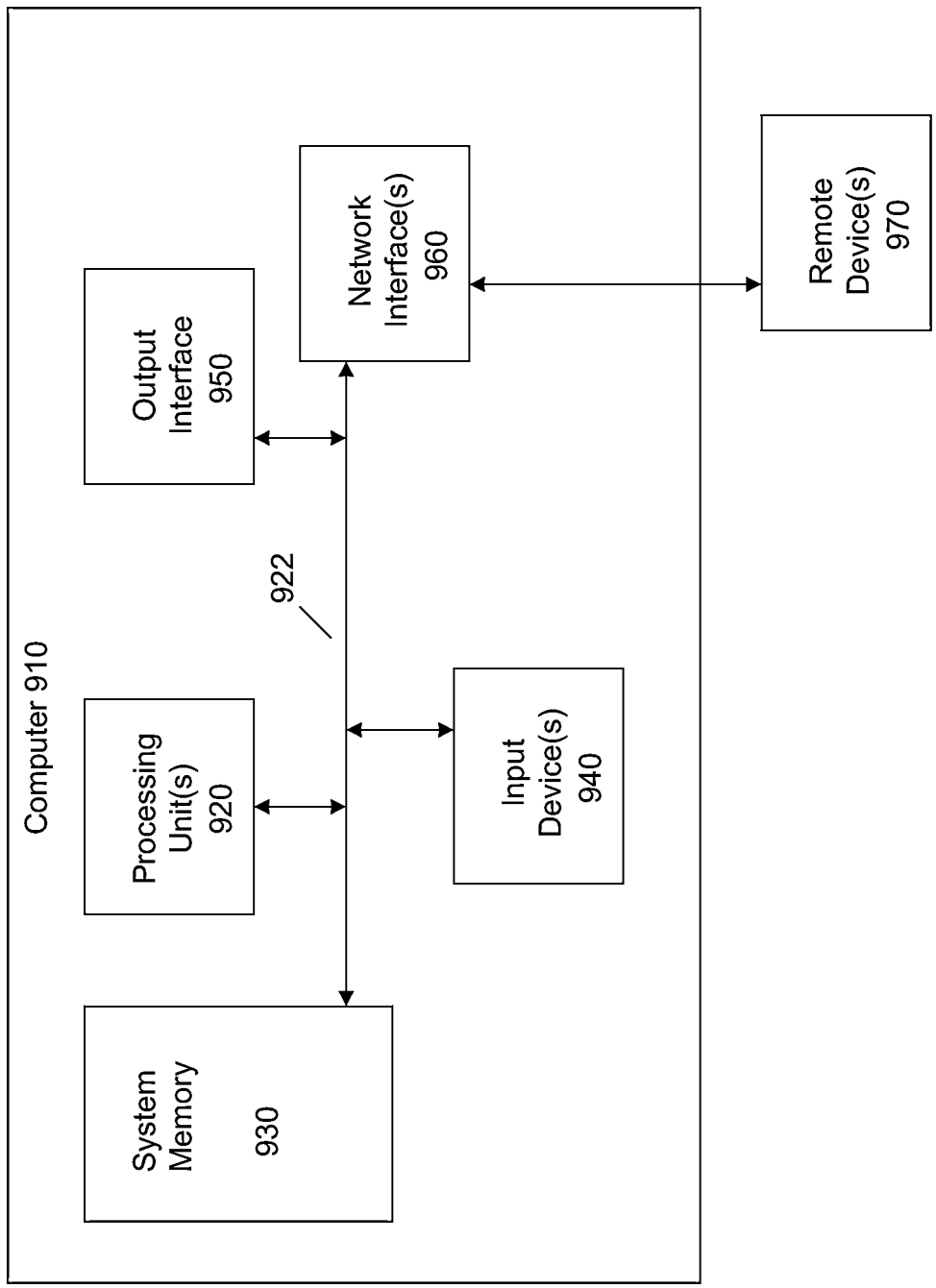
FIG. 9 illustrates an example computing device.

It will be readily understood that certain embodiments can be implemented using any of a wide variety of devices or combinations of devices. Referring to FIG. 9, an example device that may be used in implementing one or more embodiments includes a computing device (computer) 910 hosting the platform 100. In this regard, the platform 100 may be provided as a central portal for user access, wherein hosted services (data storage, data analysis, data summary and querying, and the like) are provided. For example, platform may provide a web-based access portal where a user may log in to an account instance and access pipe network and related data to access the functionality of the platform 100 described herein.

The computer 910 may execute program instructions configured to store an analyze segment data, and perform other functionality of the embodiments, as described herein. Components of computer may include, but are not limited to, a processing unit 920, a system memory 930, and a system bus 922 that couples various system components including the system memory 930 to the processing unit 920. The computer 910 may include or have access to a variety of computer readable media, for example for storing infrastructure data indices. The system memory 930 may include computer readable storage media in the form of volatile and/or nonvolatile memory such as read only memory (ROM) and/or random access memory (RAM). By way of example, and not limitation, system memory 930 may also include an operating system, application programs, other program modules, and program data.

A user can interface with (for example, enter commands and information) the computer 910 through input devices. A monitor or other type of device can also be connected to the system bus 922 via an interface, such as an output interface 950. In addition to a monitor, computers may also include other peripheral output devices. The computer 910 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: a portable computer diskette or memory stick, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible, non-signal storage medium that can contain or store a program for use by or in connection with an instruction execution system, apparatus, or device.

Computer program code may be propagated by data signal for transmission between devices. Such a propagated signal may take any of a variety of forms, including, but not limited to, electro-magnetic, optical, or any suitable combination thereof. Program code embodied on a computer readable storage medium thus may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

It will be understood that various functionality described herein may be implemented by computer program instructions. These computer program instructions may be provided to a processor of a device to produce a machine, such that the instructions, which execute via the processor create means for implementing the functions/acts specified.

These computer program instructions may also be stored in a computer readable storage medium that can direct a device to function in a particular manner, such that the instructions stored in the computer readable storage medium produce an article of manufacture including instructions which implement the function/act specified.

The computer program instructions may also be loaded onto a device to cause a series of operational steps to be performed on the device to produce a device implemented process such that the instructions which execute on the device provide processes for implementing the functions/acts specified.

Figure 10:
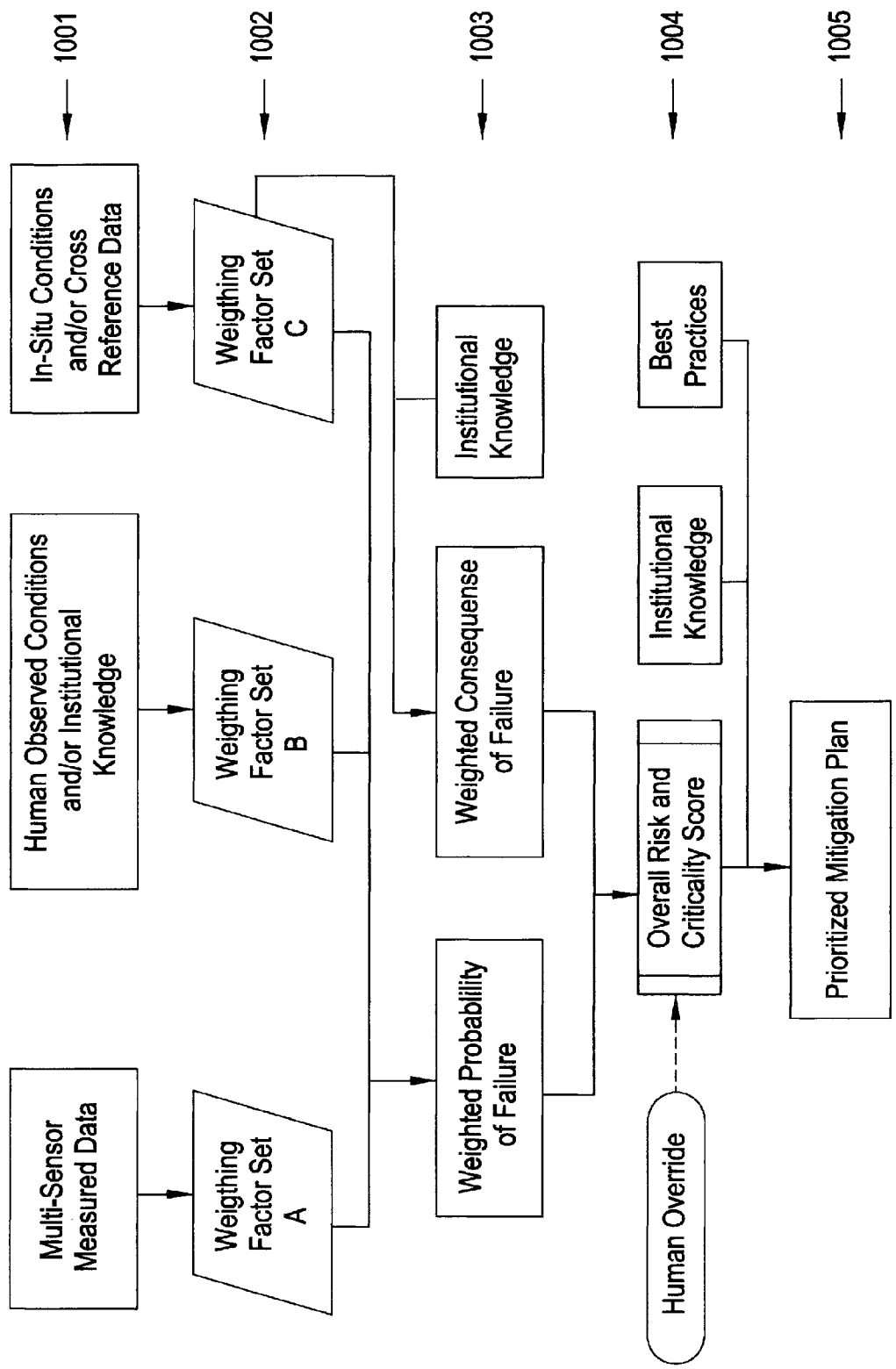
FIG. 10 illustrates an example flow of preparing a prioritized mitigation plan.

Referring to FIG. 10, an embodiment may thus receive a variety of data sources or streams, for example via platform 110, as collected in the field via data acquisition platforms, from human input/observed data, in-situ conditions, etc., and a composite score denoting the risk of associated with the asset (based on the received data) may be formed at 1001. For example, a composite score may be generated as a percent risk of failure based on corrosion amount, age, pipe material, pipe size, etc. At 1002, a user may adjust weighting given to the data sources (or components thereof) in used by the system (e.g., platform 100) in formulating the composite score.

At 1003, the system may utilize the weighted probability/percentage of failure (or like metric or characteristic), a weighted consequence of failure (e.g. as ascertained for example from historical or other data related to the infrastructure network and/or like networks available to the platform 100), and/or institution knowledge to formulate an overall risk and criticality score at 1004. Accordingly, an embodiment may provide a snapshot or summary, for example in the form of criticality score formed at 1004, to provide the user with an estimate of the condition of a network, portion thereof, and/or individual asset (e.g., a particular pipe segment). A user may manually override and/or adjust the risk and criticality score.

An embodiment may provide one or more analysis reports. For example, an embodiment may provide a failure risk and consequence analysis, for example based on the overall risk and criticality score and/or other data. This provides a user with a summary and estimate of the risk involved with an asset and the potential consequences if the risk (e.g., failure of a pipe) should occur. Various metrics or parameters may affect such a report, e.g. the nature of an asset (water pipe located in populous area v. water pipe located in a remote area), the condition of the asset, comparative data (e.g., what has happened to similar pipes), the consequences expected (e.g., based on comparative data), and the like.

At 1005 the overall risk and criticality score may be used by the system to automatically generate one or more analysis reports, for example including suggestions for handling or mitigating the situation, as may be formed into a prioritized mitigation plan (e.g., including for example prioritization of assets within the infrastructure network for mitigation measures such as repair, replacement, refurbishment, etc.). Additionally, an embodiment may provide a benchmark assessment, for example based on comparison of other infrastructure data contained in cross-reference data. Thus, a user may be apprised of how the network asset (or collection of network assets) compares against other, similar network assets. The benchmarking may be done using one or more similarity factors/parameters to select a representative comparison data set from the cross-reference data.

Figure 11A:
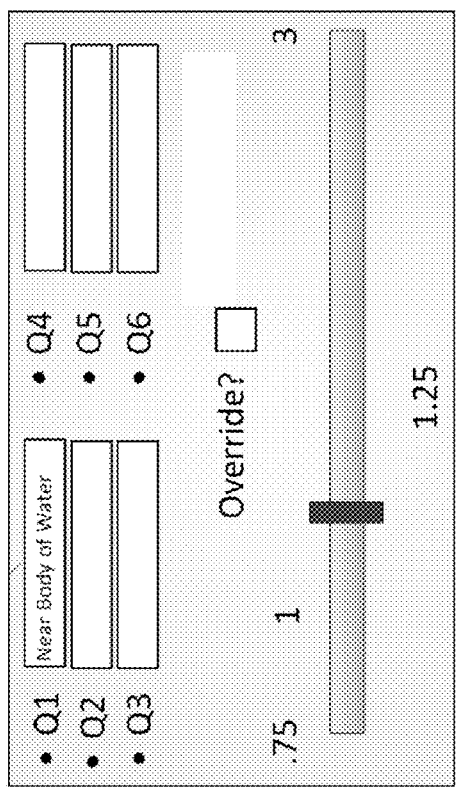
FIG. 11(A-B) illustrate example user interfaces for adjusting weighting factors.
Figure 11B:
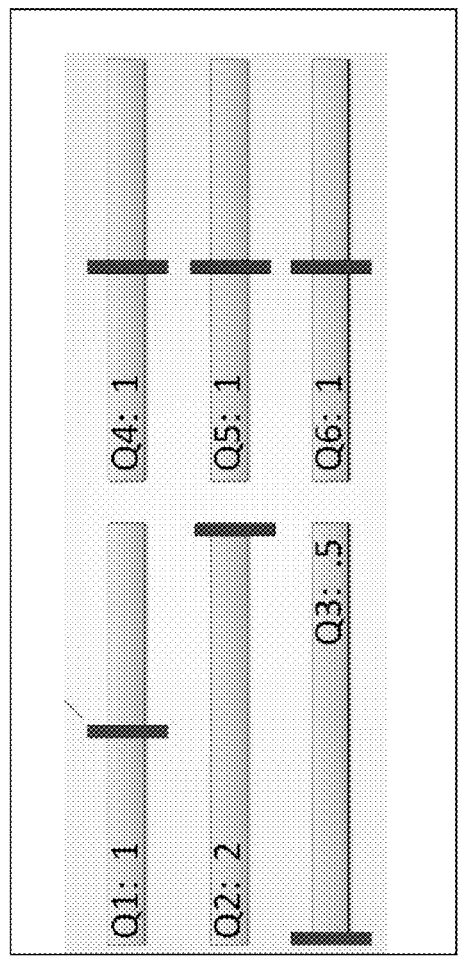

FIGS. 11A and 11B illustrate example user interfaces, for example as provided on a computer 910 monitor, with which the user may make manual adjustments within an embodiment, for example adjusting of weighting factors. As an example, illustrated in FIG. 11A is an interface a user may utilize to provide answers to questions or input factors (Q1-Q6) regarding a particular asset, portion of an infrastructure network, or network. Thus, as illustrated in FIG. 11A, a user may adjust the weighting of in-situ data by indicating if an asset is know to be located near a body of water (for example as ascertained by the system via data accessible to the platform 100), the weighting should be increased for forming the various scores and/or mitigation plans. For example, each such question or input factor may have a numerical factor that may be combined to form the overall risk score. A user may provide a manual override or adjustment, as for example in response to viewing the proposed change in weighting factor (as indicated for example via multiplication factor slider bar at the bottom of FIG. 11A).

Thus, as illustrated in the example of FIG. 11B, a user may be provided with an interface that permits adjustment of the various weighting factors determined by the system. Thus, a user may override or adjust the weighting factors determined in 1002 of FIG. 10 at 1003 of FIG. 10 using an interface as illustrated in FIG. 11B.

Figure 12:
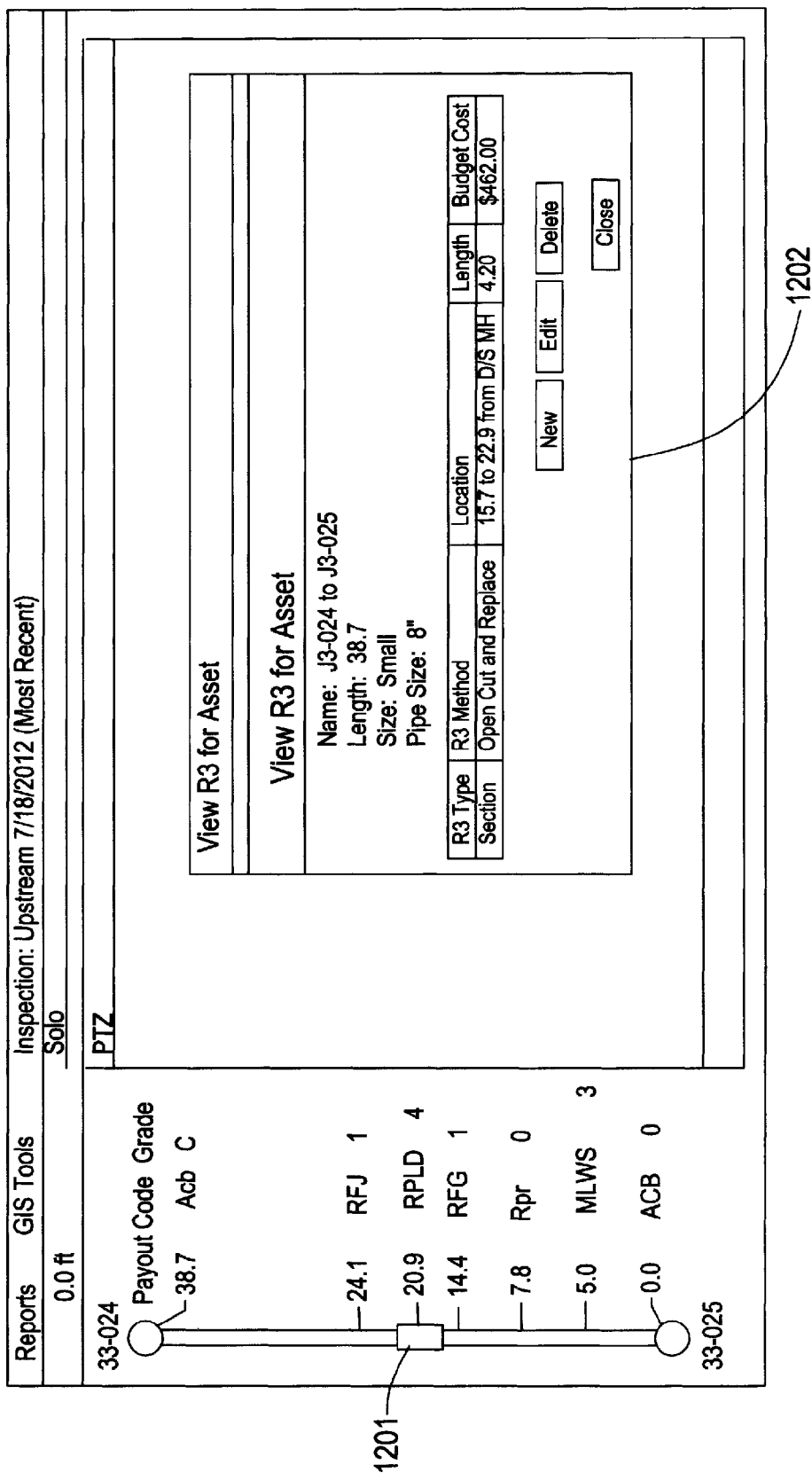
FIG. 12 illustrates an example analysis report including a prioritized mitigation plan.

In FIG. 12 an example mitigation report is illustrated at 1202, along with contextual graphic at 1201. Thus, in response to analysis by the system (including weighting of available data, as optionally adjusted by the user), the system provides the user with a prioritized mitigation plan for managing an asset, a portion of the infrastructure network, or the entire network. The prioritized mitigation plan 1202 may include but is not limited to an "R3" style report, i.e., a rehabilitation, repair or replace report, and may also include asset identification, asset features (e.g., pipe length, size), a proposed course of action (e.g., open cut and replace), an estimated cost/budget for the particular course of action, and/or an overall budget estimate for completing the plan (or a portion thereof). A pipe graph may provide a view, for example of the pipe segment being reported on, using the contextual data at 1201 as an indicator portion of the interface. This provides the user with a view into which portion of a pipe segment the report has been generated for.

Figure 13:
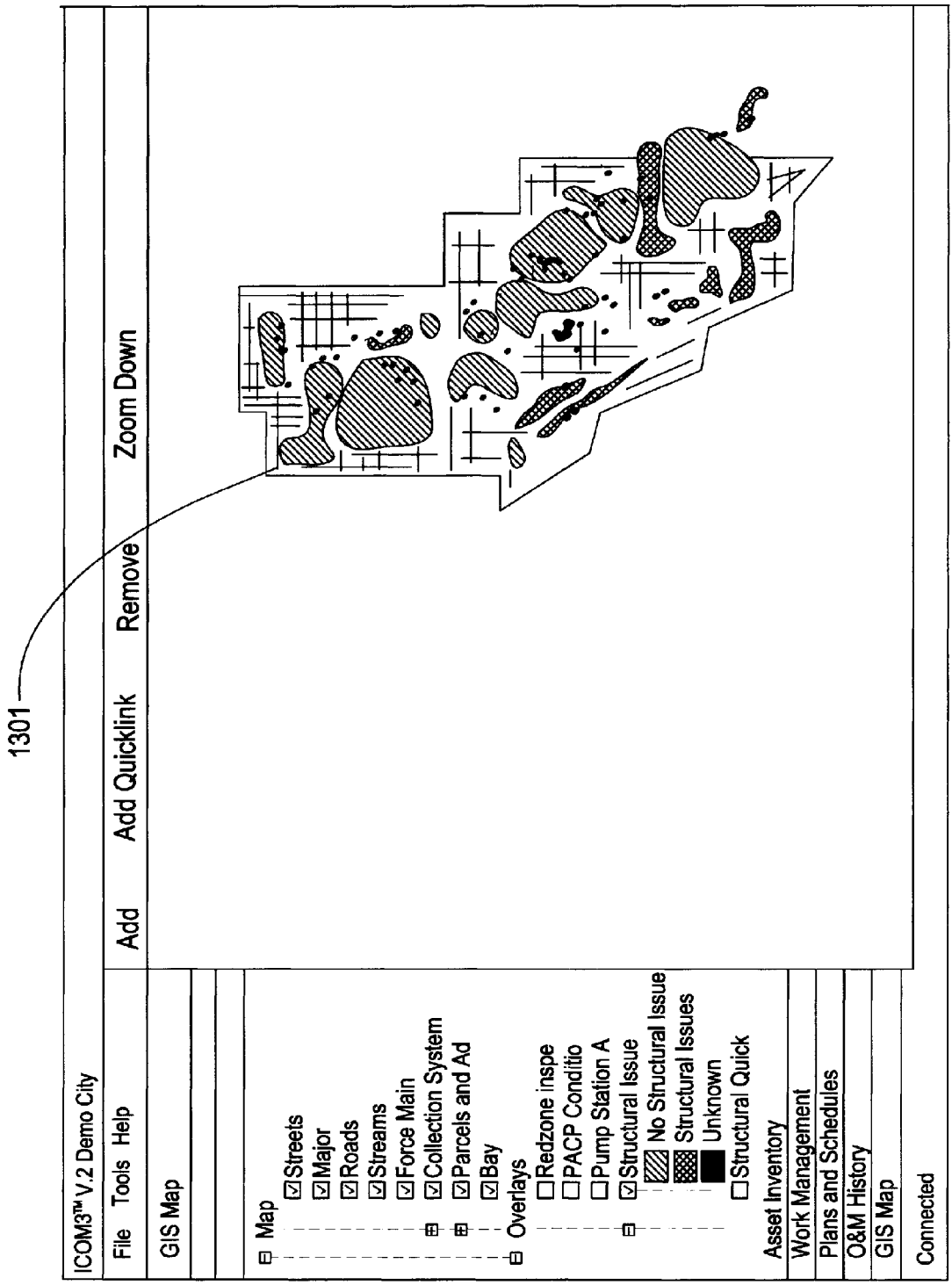
FIG. 13 illustrates an example analysis report including a global information systems (GIS) map.

Additionally, as illustrated in FIG. 13, an embodiment may provide a view summarizing the network (or portions thereof), for example in the form of a GIS map 1301. For example, following analysis of the infrastructure data, an embodiment may compile a GIS map with the infrastructure data summaries therein. This provides a user with a quick, geographically relevant view of the conditions of various assets throughout the infrastructure network (or portions thereof). That are (color) coded based on the prioritization or course of action.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method of generating an infrastructure analysis report, comprising:
    collecting, using an inspection robot, infrastructure data relating to one or more fluid conveyance infrastructure assets in a network;
    storing, by a processor, the infrastructure data in a database, wherein the infrastructure data comprises comparative data;
    identifying, by a processor, a representative fluid conveyance infrastructure asset in the network;
    summarizing, by a processor, the representative fluid conveyance infrastructure asset using the infrastructure data collected using the inspection robot;
    accessing, by a processor, the comparative data stored in the database, wherein the comparative data includes one or more of sensed data, contextual data and institutional knowledge data; and
    generating, by a processor, an analysis report, based on the one or more fluid conveyance infrastructure assets, for an uninspected fluid conveyance infrastructure asset in the network, wherein the uninspected fluid conveyance infrastructure asset has no infrastructure data in the database;
    wherein the analysis report includes a failure-risk-and-consequence analysis comprising a failure risk estimated for the uninspected fluid conveyance infrastructure asset and an estimated consequence of the failure risk; and
    wherein the failure-risk-and-consequence analysis is extended to at least a portion of the network based on the comparative data stored in the database.

2. The method of claim 1, wherein the infrastructure data is spatially and temporally indexed.

3. The method of claim 2, further comprising spatially and temporally indexing new infrastructure data added to the database.

4. The method of claim 1, wherein the analysis report is one or more of a system risk assessment report, a prioritized mitigation plan and a cost-of-system-operation report.

5. The method of claim 1, wherein the failure-risk-and-consequence analysis is based on one or more weighting factors.

6. The method of claim 5, wherein the one or more weighting factors are user-adjustable.

7. A method of generating an analysis report, comprising:
    collecting, using an inspection robot, infrastructure data relating to one or more fluid conveyance infrastructure assets in a network;
    storing, by a processor, the infrastructure data in a database, wherein the infrastructure data comprises comparative data;

identifying, by a processor, a representative fluid conveyance infrastructure asset in the network;

summarizing, by a processor, the representative fluid conveyance infrastructure asset using the infrastructure data collected using the inspection robot;

accessing, by a processor, the comparative data stored in the database, wherein the comparative data comprises cross reference data from different infrastructure networks; and generating, by a processor, an analysis report, based on the one or more fluid conveyance infrastructure assets, for an uninspected fluid conveyance infrastructure asset in the network, wherein the uninspected fluid conveyance infrastructure asset has no infrastructure data in the database;

wherein the analysis report includes a failure-risk-and-consequence analysis comprising a failure risk estimated for the uninspected fluid conveyance infrastructure asset and an estimated consequence of the failure risk; and wherein the failure-risk-and-consequence analysis is extended to at least a portion of the network based on the comparative data stored in the database.

8. The method of claim 7, wherein the infrastructure data includes one or more of sensed data, contextual data, and institutional knowledge data.

9. The method of claim 7, wherein the cross reference data includes sensed data, contextual data, and institutional knowledge data from a different infrastructure network.

10. The method of claim 7, wherein the cross reference data is obtained by using one or more similarity parameters.

11. The method of claim 7, wherein the analysis report includes one or more of a system benchmark report, a system risk assessment report, a prioritized mitigation plan and a cost-of-system-operation report.

12. A method of generating an analysis report, comprising:

collecting, using an inspection robot, infrastructure data relating to one or more fluid conveyance infrastructure assets in a network;

storing, by a processor, the infrastructure data in a database, wherein the infrastructure data comprises comparative data;

identifying, by a processor, a representative fluid conveyance infrastructure asset in the network;

summarizing, by a processor, the representative fluid conveyance infrastructure asset using the infrastructure data collected using the inspection robot;

accessing, by a processor, the comparative data stored in the database, wherein the comparative data includes contextual data; and determining, by a processor, a correlation between contextual data of at least one representative fluid conveyance infrastructure asset and contextual data of at least one target fluid conveyance infrastructure asset, wherein the at least one target fluid conveyance infrastructure asset has no infrastructure data in the database; and generating, by the processor, an analysis report based the correlation, the analysis report including a failure-risk-and-consequence analysis comprising: a failure risk estimated for the at least one target fluid conveyance infrastructure asset and an estimated consequence of the failure risk; and wherein the failure-risk-and-consequence analysis is extended to at least a portion of the network based on the comparative data stored in the database.

13. The method of claim 12, wherein the analysis report comprises one or more of a system benchmark report, a system risk assessment report, a prioritized mitigation plan and a cost-of-system-operation report.

14. The method of claim 12, wherein the contextual data of the at least one representative fluid conveyance infrastructure asset is from a different network than the at least one target fluid conveyance infrastructure asset.

15. The method of claim 12, wherein the contextual data of the at least one representative fluid conveyance infrastructure asset is from a same network as the at least one target fluid conveyance infrastructure asset.

* * * * *